United States Patent Office 3,240,834
Patented Mar. 15, 1966

3,240,834
DEHYDROHALOGENATION OF
HYDROCARBON HALIDES
Carl W. Kruse and Gardner C. Ray, Bartlesville, Okla., assignors to Phillips Petroleum Company, a corporation of Delaware
No Drawing. Filed July 2, 1962, Ser. No. 207,080
6 Claims. (Cl. 260—677)

This invention relates to a process and catalysts for dehydrohalogenation of hydrocarbon halides to their corresponding olefins.

Various processes have been disclosed in the literature for the introduction of unsaturation into organic compounds. One of the more important of these is dehydrohalogenation, whereby a halogenated hydrocarbon is treated in such a manner as to cause the halogen to split off carrying with it a hydrogen from an adjacent carbon atom. Thus, the net result is the formation of a double bond in the molecule of the hydrocarbon, and the production of a molecule of halogen acid.

In many cases, this reaction can be thermally initiated. Thus, heating at elevated temperatures is frequently sufficient to split off the hydrogen halide from the molecule in question. However, for greater convenience, in order to operate at lower temperatures with shorter reaction times and for greater freedom from undesirable side reactions, dehydrohalogenation catalysts are frequently used. Such a catalyst promotes the reaction to the extent that it is carried out more completely, in a shorter length of time, and frequently at a lower temperature. A number of such catalysts have been disclosed in the literature such as metals, metal salts, and other composites containing refractories, clays, alloys, and the like.

Previously described methods for converting organic halogen compounds into olefins have generally involved dehydrohalogenation in either the vapor or liquid phase, either without or with catalysts of a variety of types. The vapor phase reactions are frequently unsatisfactory because of the side-reactions which occur at the high temperatures which are required. Certain known dehydrohalogenation catalysts, for example, metal salts, are known to cause rearrangements, isomerizations, and even degradation of the hydrocarbon halids to which they may be applied.

There exists a problem, moreover, when the hydrocarbon halide to be dehydrohalogenated, exists not as a pure compound, but in a mixture of the halogenated compounds which may comprise primary, secondary, and tertiary halides, i.e., compounds containing halogen atoms attached to primary, secondary, and tertiary carbon atoms. Such a situation is encountered, for example, when the dehydrohalogenation is carried out as a means of separating out one or more of the constituents. The resulting olefinic compounds are generally lower boiling and therefore can be removed by fractional distillation. Conditions are generally chosen in an attempt to obtain olefins resulting from only one of the halides, as for example, from the dehydrohalogenation of only the tertiary halides.

While it is generally true that tertiary halides are dehydrohalogenated more easily than secondary halides, and both of those more easily than primary halides, it is nevertheless difficult to avoid obtaining a substantial mixture of olefins when mixtures of tertiary, secondary, or primary halides are dehydrohalogenated, regardless of the degree of severity of the conditions.

Activated carbon black and activated charcoal have long been useful for purifying liquids, adsorbing noxious gases, decolorizing, deodorizing, water purification, solvent reclamation, separating and recovery of mixtures, and as catalyst carriers. They are prepared from a variety of raw materials such as bagasse, bones, cocoanut shells, corncobs, cottonseed hulls, fruit pits, lignin, lignite, nutshells, peat, petroleum, coke, and sawdust. After initial carbonization, such as by heating in the absence of air at about 600° C., the charred material is then activated by any one of a variety of ways such as continued heat treating, addition of salts followed by heat treating and leaching out of the salts, treatment at elevated temperatures with $CO_2$, steam, chlorine, sulfur dioxide, phosphoric acid, etc,. and treatment with chemicals which bring about corrosive action such as with caustic soda, potassium sulfide, and potassium thiocyanate.

The prior art has suggested that commercially available carbonaceous materials, such as charcoal or activated carbon might be suitable as catalysts for a dehydrohalogenation reaction. However, it has been found that carbonaceous materials, which have been prepared in such a way as to be highly suitable for adsorptive applications, are not necessarily suitable for such catalytic use, particularly for selective dehydrohalogenation. In fact, we have found that most varieties of conventionally activated carbon or charcoal show little or no activity for dehydrohalogenation.

It is an object of this invention to provide a process for dehydrohalogenation of organic halogen compounds by catalytic treatment.

It is another object of this invention to provide a novel carbon containing catalyst for the efficient dehydrohalogenation of halogenated hydrocarbons, substantially free from undesirable side reactions such as rearrangements and isomerizations.

It is a further object of this invention to provide a process by which difficulty separable mixture of hydrocarbon halides may be separated by selectively converting tertiary, or tertiary and secondary, halides to their corresponding olefinic compounds, which olefins are readily separable.

These and other objects will be apparent from the description hereinbelow.

We have discovered a simple method of making a conventionally activated carbonaceous material further suitable for catalytic dehydrohalogenation by an air oxidation treatment in the temperature range of 300 to 700° C., whereby the resulting oxidized carbonaceous material is made active for the dehydrohalogenation of hydrocarbon halides having from 3 to 18 carbon atoms by contact under reaction conditions and in the temperature range of from 100 to 700° C.; said novel catalyst being selective for the dehydrohalogenation of tertiary hydrocarbon halides, in the presence of secondary and primary halides, in the temperature range between about 125 and 200° C.; and said catalyst further being selective for the dehydrohalogenation of both tertiary and secondary hydrocarbon halides in the presence of primary halides, in the temperature range between about 225° and 300° C. Primary chlorides will not be substantially effected until temperatures greater than 300° C. are reached. Generally, the catalyst of this invention is more active for dehydrohalogenation and permits operation at lower temperatures, than catalysts taught in the prior art.

The dehydrohalogenation catalysts employed in accordance with our invention are prepared from a conventionally activated carbon, which can be made particularly active for purposes of this invention by an oxidizing treatment in air at elevated temperatures. Indeed, carbon may be favorably affected by air contact in this way even at low temperature, such as room temperature, but the action, which may conceivably require months or years, is too slow to be convenient. It is, therefore, more convenient to carry out the oxidative treatment at temperatures greater than about 300° C., and more preferably at temperatures of 500–700° C. At these higher temperatures, the time of treatment will vary between one second to about one hour, but will generally be about 1–15 minutes. Some minor loss of carbon also generally takes place in the treatment. If desired, the air used for the oxidizing treatment may be diluted with inert gases to better control the treatment and to minimize combustion losses.

The particle size of the oxidized activated carbon may vary over a wide range. Particles smaller than 325 mesh (U.S. series) are useful as well as granular material of about 6 mesh, and intermediate sizes. The granular material is favored for continuous fixed bed type reactions.

In addition to active carbons, the process of this invention may use carbon black pigments, as well. The oxidation of carbon black under the conditions stated earlier, also produces a material catalytically active for dehydrohalogenation. The activation treatment is most beneficial with the so called furnace carbon blacks which are prepared under generally reducing conditions. On the other hand, the so called channel carbon blacks are prepared under generally oxidizing conditions and, consequently, frequently posses some catalytic activity even before the treatment disclosed in this invention.

The invention is applicable to the dehydrohalogenation of $C_3$ to $C_{18}$ halogenated hydrocarbons where it is possible to split off an atom of halogen together with hydrogen from an adjacent carbon atom, resulting in the formation of a molecule of hydrogen halide and a molecule containing an olefinic double bond. Although the process may be applied primarily to chlorinated materials, it is applicable to brominated, fluorinated, and iodinated materials as well. Depending upon the compound to be dehydrohalogenated and the desired speed of reaction, the conversion temperature will vary from 100–700° C. It is particularly applicable to monohalogenated hydrocarbons; such as monochlorinated, saturated acyclic and saturated cyclic compounds such as alkanes, cycloalkanes, and alkyl substituted cycloalkanes.

Examples of suitable hydrocarbon chlorides which may be dehydrochlorinated by the present process are cyclopentyl, ethylcyclopentyl, cyclohexyl, methylcyclohexyl, isopropyl, butyl, amyl, hexyl, heptyl, octyl, dodecyl, tetradecyl, octadecyl, 1-chloro-2,3-dimethylbutane, 2-chloro-2,3-dimethylbutane, 3-chloro-4,4-dimethylheptane, and the like. The process of this invention offers a convenient method of producing useful cycloolefins such as cyclopentene, methylcyclopentenes, cyclohexene, and methylcyclohexenes from the corresponding cycloalkyl chlorides as well as branched and unbranched acyclic olefins from the respective acyclic alkyl chlorides.

The process of this invention may be carried out either in the liquid or vapor phase. Atmospheric, subatmospheric, or superatmospheric pressures may be used. It is generally desirable to expedite the separation and removal of the hydrogen halide from the newly generated olefin to minimize recombination. A liquid phase operation, for example, can be carried out in a distillation type assembly where the catalyst and liquid hydrocarbon halide are contacted and heated together in a distillation pot, at a temperature and pressure sufficient to distill out the newly formed olefin while retaining the unconverted halide. The hydrogen halide gas is absorbed or vented after separation from the reaction mixture. A gas phase operation, for example, can be carried out by passing the volatilized organic halide through a bed of catalyst at the rate chosen to provide the desired degree of conversion. Unconverted material can be recycled. In batch operation, the catalyst concentration will range from about 0.01 to about 25 weight percent of the halide. In continuous operation the liquid hourly space velocity will range from about 0.01 to about 10 volume of liquid per volume catalyst per hour. In whichever technique is used, an inert carrier gas may be used to assist the flow of products and by-products within the reaction system.

The invention may be further illustrated by the following examples:

*Example I*

A 6.1 g. quantity of granular petroleum base activated charcoal (Amend Drug and Chemical Company) was placed in a porcelain crucible over a gas-oxygen flame for 3 minutes at 600–700° C. in air. A 5.8 g. quantity of oxidized activated charcoal was recovered and found active for dehydrohalogenation.

*Example II*

A 4.2 g. quantity of 6–14 mesh activated cocoanut charcoal (Amend Drug and Chemical Company) was placed in a porcelain dish and heated in the presence of air to 600–650° C., as indicated by a thermocouple placed within the charcoal. The treatment was continued for 7–8 minutes during which time the mass glowed a cherry red color and flamed several times. A 3.5 g. quantity of oxidized activated charcoal was recovered and found active as a dehydrohalogenation catalyst.

*Example III*

A dehydrochlorination apparatus was prepared consisting of a vertical Pyrex tube (19 mm. I.D., 12.5 inches long) with a 4 mm. O.D. Pyrex thermowell in the center. A metering apparatus was used to add the hydrocarbon chloride into the top of the tube. Nitrogen was introduced at the point of chloride addition. The column contained a 3.3 g. (9 ml.) bed of oxidized activated charcoal (prepared by treating Darco lignite-based activated charcoal for 10 minutes in air at 600–700° C.). The bed was supported from below with about 2 inches of graduated glass packing and the remainder of the tube was filled with glass beads to form a preheat zone. The reaction tube was placed vertically in an electric furnace for heating. A 25 ml. scrubber was placed at the bottom of the reactor tube and immersed in an ice bath. This scrubber contained about 22 ml. of NaOH solution through which the effluent was passed. This neutralized the evolved HCl, thus preventing its recombination with the newly formed olefin. A Dry Ice trap was connected as a receiver. In operation, the halogenated material was metered into the top of the column where it became vaporized. Nitrogen carrier gas was also added at this point. The reaction mixture passed downward through the catalyst bed and into the scrubber which removed the HCl, and condensed most of the olefins. Any entrained olefin was condensed and collected in the Dry Ice trap and the nitrogen was vented to the atmosphere.

During a 138 minute run at 286–294° C. at a liquid hourly space velocity of 0.48, an 8.73 g. charge of chlorinated 2,3-dimethylbutane was passed through the column and dehydrohalogenated. A 6.98 g. quantity of the dehydrohalogenated effluent was recovered. The detailed distribution of the components of the feed and effluent was as follows:

|  | Feed, g. (moles) | Effluent, g. (moles) |
| --- | --- | --- |
| Miscellaneous lights | 0.0690 | } 0.4060 |
| 2,3-dimethylbutane | 0.619 (0.00719) |  |
| 2-chloro-2,3-dimethylbutane | 2.915 (0.0242) | 0.507 (0.00420) |
| 1-chloro-2,3-dimethylbutane | 5.217 (0.0425) | 3.451 (0.0286) |
| 2,3-dimethylbutene-1 |  | 0.730 (0.00869) |
| 2,3-dimethylbutene-2 |  | 1.813 (0.0216) |
| Methylpentenes |  | 0.0712 (0.00084) |

These data indicate a 45.4 percent yield of olefinic compounds per pass and an ultimate yield of 89.4 percent. A relatively small amount of feedstock was rearranged to the methylpentenes as indicated by the 97.3 percent purity of the $C_6$ olefins.

In contrast to the above, dehydrochlorination of a similar feedstock at about 300° C. under similar conditions, except that $BaCl_2$ was used as the catalyst, produced inferior results. The 2,3-dimethylbutenes were found diluted, with isomeric hexenes due to skeletal isomerization. These isomeric hexenes were not separable from the desired product olefins by distillation and limited the olefin purity to a maximum of 92–95 percent.

*Example IV*

The same apparatus and catalyst described in Example III was also used to dehydrohalogenate a charge of mixed dodecyl chlorides.

During a 72 minute run at 284–293° C. and at a liquid hourly space velocity of 0.74, a 6.87 g. charge containing 0.0314 moles of monochlorinated n-dodecane was passed through the dehydrochlorination apparatus. (The charge also contained 0.414 g. of n-dodecane and n-dodecenes which were present incidentally and assumed to pass through the process unchanged.) A 5.44 g. quantity of the dehydrochlorinated effluent was recovered; analysis showed the effluent to contain 0.0318 mole of n-dodecenes and 0.00036 mole of unreacted dodecyl chlorides.

These data indicated, from the increase in olefins, that the per pass yield was 93.5 percent and the ultimate yield was 94.6 percent. Further, the effluent purity was 98.6 percent olefin. Hydrogenation of the product and subsequent examination of the saturated material showed no rearrangement of the hydrocarbon skeleton.

*Example V*

Using the same apparatus and catalyst of Example III, and using the same general procedure, a 7.61 g. charge of secondary and tertiary monochlorinated methylcyclohexanes was converted at 222–228° C., in good yield, to a mixture of methylcyclohexenes and methylenecyclohexane.

*Example VIA*

A 0.388 gram-mole quantity of a mixture of methylcyclohexyl chlorides containing 61 percent or 0.237 mole 1-chloro-1-methylcyclohexane, and 39 percent or 0.151 mole of 2-, 3-, and 4-chloromethylcyclohexanes was charged into a distillation pot upon which was mounted an 18 x 0.75 inch column filled with glass helices. About 0.5 g. of 6–14 mesh cocoanut charcoal (active for dehydrohalogenation) was added, and external heat was applied to the pot to initiate the reaction. At a pot temperature of 148.5° C., the olefinic product began to be collected as overhead product, while the hydrogen chloride escaped as a gas. The reaction and distillation continued smoothly until a pot temperature of 153–155° C. was reached during which time product was continuously collected at a head temperature of 107–110° C. At this point, the product coming overhead was markedly reduced and the run was therefore halted. The results of the run are seen in the material balance (in moles) shown in the table below:

|  | Pot charge | Distillate | Pot residue |
| --- | --- | --- | --- |
| 1-chloro-1-methylcyclohexane | 0.237 | 0.015 | 0.012 |
| 2-, 3-, 4-chloro-1-methylcyclohexanes | 0.151 |  | 0.151 |
| 1-methylcyclohexene |  | 0.171 | 0.014 |
| Methylenecyclohexane |  | 0.005 |  |
| 3-, 4-methylcyclohexenes |  | 0.002 |  |

The data show that the branched olefins (1-methylcyclohexene and methylenecyclohexane) resulting from the dehydrochlorination of 1-chloro-1-methylcyclohexane amounted to more than 98 percent of the olefins in the distillate. Only about 1.5 percent of the secondary chlorides were dehydrochlorinated to produce the nonbranched olefins. The total amount of branched olefins produced indicate an 80 percent yield at an 88 percent conversion, or an ultimate yield of 91 percent.

Conventional dehydrochlorination processes employing catalysts, such as $FeCl_3$ and $ZnCl_2$ were found unsuitable when tested under similar conditions. Those processes suffered from severe foaming which was believed to result from the surfactant properties of higher molecular weight condensation products caused by undesirable side reactions, such as alkylation. The metal halide catalyst processes were, moreover, essentially non-selective.

*Example VIB*

This example illustrates the invention by comparing the activity of a treated and untreated petroleum base charcoal.

In the apparatus suitable for liquid phase dehydrochlorination (see Example VIA), a 50 g. sample of methylcyclohexyl chlorides, containing 0.2578 mole of 1-chloromethylcyclohexane and 0.1191 mole of secondary methylcyclohexyl chlorides, was contacted with 0.5 g. of untreated petroleum base charcoal (Amend Drug and Chemical Company). Only 1.5 g. of distillate was collected at 110° C. over a 2½-hour period at a kettle temperature of 148–151° C. Analysis of the distillate showed that it contained 1.02 g. (0.0107 mole) of branched olefins (methylenecyclohexane and 1-methylcyclohexene). This represents a 5 percent yield of these olefins, based upon the 1-chloromethylcyclohexane charged.

A 0.5 g. portion of this same charcoal after the invention oxidation treatment (see Example I) was added to the pot. There was a good rate of HCl evolution. In 4½ hours, 19.3 g. of distillate had been collected at 110° C., and there was a pot residue and column holdup of 17.6 g. An analysis of the distillate showed 1.2 g. (0.0091 mole) of 1-chloromethylcyclohexane, 16.53 g. (0.1722 mole) of 1-methylcyclohexene, 0.17 g. (0.0018 mole) of 3- and 4-methylcyclohexenes, 1.12 g. (0.0117 mole) of methylenecyclohexene and about 0.28 g. of unidentified material. The residue contained 15.05 g. (0.1135 mole) of secondary methylcyclohexyl chlorides and 2.55 g. (0.0266 mole) of 1-methylcyclohexene. The total batch yield of 1-methylcyclohexene and methylenecyclohexane was 21.3 g. (0.221 mole) or 85.7 percent of theoretical. The yield of 3- and 4-methylcyclohexenes was only 1.5 percent; there was a 95.2 percent recovery of secondary methylcyclohexyl chlorides.

*Example VIC*

This example demonstrates the invention with a cocoanut charcoal and shows the beneficial effect of the invention treatment compared with other treatments.

In the same apparatus, as shown above, a 50 g. sample of chloride (30.0 g.-0.233 mole of 1-chloromethylcyclohexane and 19.1 g.-0.144 mole of secondary methylcyclohexyl chlorides) was contacted with 0.5 g. of untreated cocoanut charcoal (Amend Drug and Chemical Company) which had been treated with oxygen for 32 hours at 100° C. The yield of the desired olefins was only 5 percent in three hours. The experiment was repeated with another 50 g. of the same chlorides mixture, but with 0.5 g. of cocoanut charcoal that had been saturated with water. There was no evidence of dehydrochlorination in three hours at 152° C. An 0.5 g. sample of the charcoal that had been oxidized as described in Example II was then added. In three hours at 150° C. a total of 20.9 g. of distillate was collected at 111° C. There was 21.2 g. of residue. A total of 17.8 g. of the branched olefins had been produced or a 79.4 percent yield. There was a 5.35 g. recovery of 1-chloromethylcyclohexane bringing the ultimate yield to 96 percent. The recovery of secondary chlorides amounted to 18.5 g. or 96.9 percent. The yield of 3- and 4-methylcyclohexanes was only 0.18 g. or 1.3 percent.

Example VID

This example demonstrates the improvement imparted to a lignite-based charcoal by the invention treatment.

A sample of Darco activated charcoal (lignite base) was found to have some activity as received, but its efficiency was increased by the oxidation treatment. When 0.5 g. of the charcoal was added to 100 g. of methylcyclohexyl chlorides (1-chloro 68.4 g.-0.5157 mole; secondary chloro 31.6 g.-0.2382 mole) in the apparatus described above the rate of HCl evolution was slow. Only 6.8 ml. of distillate was obtained in three hours. Another 0.5 g. of catalyst was added and a total of 56.8 ml. of distillate was collected in a total of 17 hours. Analysis of the 46.8 g. of distillate and the 33.4 g. of residue showed that 0.461 mole of branched olefins had been produced or 89.4 percent yield. The recovery of 1-chloro isomer brought the ultimate yield to 94.6 percent. The yield of the 3- and 4-methylcyclohexenes was 3 percent and the recovery of secondary chlorides was 96.7 percent. A 7.8 g. sample of the charcoal was heated for about 10 minutes in an open porcelain dish to a cherry red color. There was a 3.3 g. loss in weight. Only 0.5 g. of this material was used with another 100 g. of the same chlorides mixture. In 5 hours and 40 minutes, 59 ml. (47.9 g.) of distillate was collected at 111° C. There was 33.3 g. of residue. The yield of branched olefins was 0.486 mole or 94.2 percent theoretical. The recovery of the 1-chloro isomer brought the ultimate yield to 98.2 percent. There was a 2.0 percent yield of 3- and 4-methylcyclohexenes and a 96.4 percent recovery of secondary methylcyclohexyl chlorides.

Conventional dehydrochlorination processes employing catalysts, such as $FeCl_3$ and $ZnCl_2$ were found unsuitable when tested under similar conditions. Those processes suffered from severe foaming which was believed to result from the surfactant properties of higher molecular weight condensation products caused by undesirable side reactions, such as alkylation. The metal halide catalyst processes were, moreover, essentially nonselective.

Example VII

The same apparatus of Example III was used again in this example to dehydrochlorinate a charge of n-dodecyl monochlorides.

During a 2 hour and 10 minute run at 293-298° C., a 17.18 g. charge of a mixture of n-dodecyl chlorides was passed through the column and dehydrochlorinated. (The charge also contained 1.036 g. of n-dodecane and n-dodecenes which were present incidentally and which were assumed to pass through the process unchanged.) A 14.27 g. quantity of dehydrochlorination effluent was recovered. The detailed distribution of the components of the feed and effluent was as follows:

|  | Feed, g. (moles) | Effluent, g. (moles) |
| --- | --- | --- |
| Incidental n-dodecane and n-dodecenes | 1.036 | 1.036 |
| Olefin product |  | 11.836 |
| Sec-dodecyl chlorides | 13.847 (0.0676) | None |
| Prim-dodecyl chlorides | 2.294 (0.0112) | 1.398 (0.00682) |

These data show that 100 percent of the sec-dodecyl chlorides were converted, whereas only 39 percent of the primary chlorides were dehydrochlorinated. Although this run clearly demonstrates the selectivity of the process, it must be noted that similar runs in the preferred recited temperature range (240-270° C.) are capable of even greater selectivity.

Various modifications and alteration of this invention will become apparent to those skilled in the art from the foregoing discussion and the claims without departing from the scope and spirit of this invention, and it should be understood that this invention is not to be unduly limited thereto.

We claim:

1. A process for producing branched monoolefins by the selective dehydrohalogenation of a mixture of tertiary, secondary, and primary hydrocarbon halides comprising: intimately contacting said mixture with a partially oxidized particulate conventionally activated carbonaceous material produced by subjecting a particulate carbonaceous material selected from the group consisting of carbon black and activated carbon to free-oxygen containing gas in the temperature range from 500-700° C. during a period of time ranging from about one second to one hour; heating the resulting mixture in the temperature range of between about 125 and 200° C. and under conditions of pressure so as to volatilize the resulting branched olefins; and separately recovering the olefinic compounds, leaving unconverted secondary and primary hydrocarbon halides suitable for recycling to further dehydrohalogenation.

2. The process according to claim 1 wherein said branched olefins comprise 1-methylcyclohexene, methylenecyclohexane, 2,3-dimethylbutene-1, and 2,3-dimethylbutene-2.

3. A process for producing branched monoolefins by the selective dehydrochlorination of a mixture of tertiary, secondary, and primary hydrocarbon chlorides comprising: intimately contacting said mixture with a partially oxidized particulate carbonaceous material produced by subjecting a particulate carbonaceous material selected from the group consisting of carbon black and activated carbon to free-oxygen containing gas in the temperature range from 500-700° C. during a period of time ranging from about one second to one hour; heating the resulting mixture in the temperature range of between about 125 and 200° C. and under conditions of pressure so as to volatilize the resulting branched olefins; and separately recovering the olefinic compounds, leaving unconverted secondary and primary hydrocarbon chlorides suitable for recycling to further dehydrochlorination.

4. A process for producing branched and unbranched monoolefins by the selective dehydrohalogenation of a mixture of tertiary, secondary, and primary hydrocarbon halides comprising: intimately contacting said mixture with a partially oxidized particulate carbonaceous material produced by subjecting a particulate carbonaceous material selected from the group consisting of carbon black and activated carbon to free-oxygen containing gas in the temperature range from 500-700° C., during a period of time ranging from about one second to one hour; heating the resulting mixture in the temperature range of between about 125 and 300° C., and under conditions of pressure so as to volatilize the resulting branched and unbranched olefins; and separately recovering the olefinic compounds, leaving unconverted primary hydrocarbon halides suitable for recycling to further dehydrohalogenation.

5. A process for producing monoolefins by the selective dehydrochlorination of a mixture of primary and secondary n-dodecyl chlorides, comprising: intimately contacting said mixture with a partially oxidized particulate carbonaceous mixture produced by subjecting a particulate carbonaceous material selected from the group consisting of carbon black and activated carbon to free-oxygen containing gas in the temperature range from 500-700° C. during a period of time ranging from one second to about one hour; heating the resulting mixture in the temperature range of between about 125 and 300° C., and under conditions of pressure so as to volatilize the resulting olefins; and separately recovering the concurrently produced hydrogen chloride, leaving any unconverted primary dodecyl chlorides suitable for recycling to further dehydrochlorination.

6. A process for producing branched monoolefins by the selective dehydrochlorination of a mixture of secondary and tertiary methylcyclohexyl chlorides, comprising: intimately contacting said mixture with a partially oxidized particulate carbonaceous mixture produced by subjecting a particulate carbonaceous material selected from the group consisting of carbon black and activated carbon to free-oxygen containing gas in the temperature range from 500–700° C. during a period of time ranging from one second to about one hour; heating the resulting mixture in the temperature range of between about 125 and 300° C., and under conditions of pressure so as to volatilize the resulting branched olefins; and separately recovering the concurrently produced hydrogen chloride, leaving any unconverted secondary methylcyclohexyl chlorides suitable for recycling to further dehydrochlorination.

References Cited by the Examiner

UNITED STATES PATENTS

| | | | |
|---|---|---|---|
| 1,634,480 | 7/1927 | Wickenden et al. | 252—445 |
| 1,699,243 | 1/1929 | Lemon | 252—445 |
| 2,288,580 | 6/1942 | Baehr et al. | 260—677 |
| 2,314,335 | 3/1943 | Frey | 260—677 X |
| 2,708,210 | 5/1955 | Sias | 260—677 |

OTHER REFERENCES

"The Journal of Industrial and Engineering Chemistry" (April 1919), volume 2, No. 3, pages 282–6.

ALPHONZO D. SULLIVAN, *Primary Examiner.*

DANIEL E. WYMAN, *Examiner.*